(12) United States Patent
Shiota et al.

(10) Patent No.: US 7,639,877 B2
(45) Date of Patent: Dec. 29, 2009

(54) APPARATUS AND PROGRAM FOR SELECTING PHOTOGRAPHIC IMAGES

(75) Inventors: Kazuo Shiota, Tokyo (JP); Kiyotaka Kaneko, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 671 days.

(21) Appl. No.: 10/765,963

(22) Filed: Jan. 29, 2004

(65) Prior Publication Data
US 2004/0258304 A1 Dec. 23, 2004

(30) Foreign Application Priority Data
Jan. 31, 2003 (JP) ............................. 2003-023901

(51) Int. Cl.
G06K 9/46 (2006.01)
G06K 9/62 (2006.01)

(52) U.S. Cl. ...................................... 382/190; 382/224

(58) Field of Classification Search .................. 382/190
See application file for complete search history.

(56) References Cited

U.S. PATENT DOCUMENTS

| | | | |
|---|---|---|---|
| 5,848,217 A * | 12/1998 | Tsukagoshi et al. | 386/68 |
| 6,018,397 A | 1/2000 | Cloutier et al. | |
| 6,079,885 A * | 6/2000 | Sano | 400/76 |
| 6,498,861 B1 * | 12/2002 | Hamid et al. | 382/124 |
| 6,564,225 B1 | 5/2003 | Brogliatti et al. | |
| 2002/1006573 * | 5/2002 | Florance et al. | 705/26 |
| 2002/0118883 A1 * | 8/2002 | Bhatt | 382/224 |
| 2003/0002715 A1 * | 1/2003 | Kowald | 382/118 |
| 2003/0002720 A1 * | 1/2003 | Wada | 382/124 |
| 2003/0009469 A1 * | 1/2003 | Platt et al. | 707/100 |
| 2003/0044062 A1 * | 3/2003 | Ganapathy et al. | 382/165 |
| 2003/0078897 A1 * | 4/2003 | Florance et al. | 705/80 |
| 2003/0126121 A1 * | 7/2003 | Khan et al. | 707/3 |

FOREIGN PATENT DOCUMENTS

| | | |
|---|---|---|
| JP | 3-76449 B2 | 12/1991 |
| JP | 2000-48184 A | 2/2000 |
| JP | 2000-137722 A | 5/2000 |
| JP | 2000-295553 A | 10/2000 |
| JP | 2001-8135 A | 1/2001 |
| JP | 2001-256498 A | 9/2001 |
| JP | 2002-10179 A | 1/2002 |
| WO | WO-97/48076 A1 | 12/1997 |

* cited by examiner

*Primary Examiner*—Bhavesh M Mehta
*Assistant Examiner*—David P Rashid
(74) *Attorney, Agent, or Firm*—Birch, Stewart, Kolasch & Birch, LLP

(57) ABSTRACT

Automatic selection of best shots from among a plurality of photographic images is enabled, while retaining photographic images of scenes, for which a possibility exists that a user feels are necessary, regardless of image quality. A readout portion reads out a plurality of photographic images, which are recorded on a memory card. A classifying portion classifies these photographic images into similar photographic image groups, which include similar photographic images. A selection condition setting portion of an extracting portion sets selection conditions so that at least one qualified photographic image is selected from each similar photographic image group. The extracting portion extracts qualified photographic image groups form each similar photographic image group, based on the set selection conditions. A printing portion prints only the qualified photographic images, and a recording portion records the qualified photographic images and other photographic images in different folders of a CD-R.

14 Claims, 3 Drawing Sheets

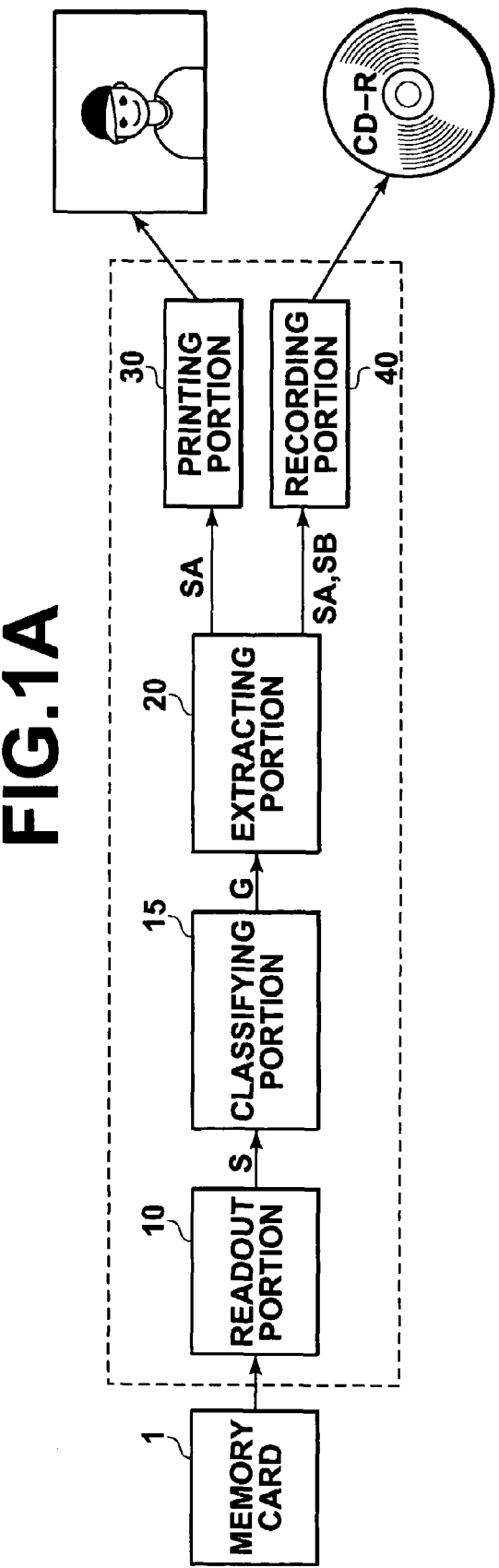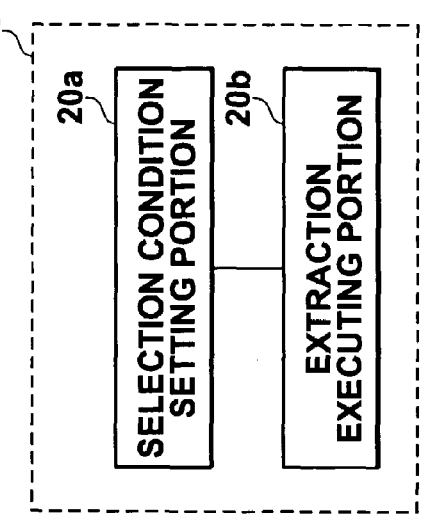

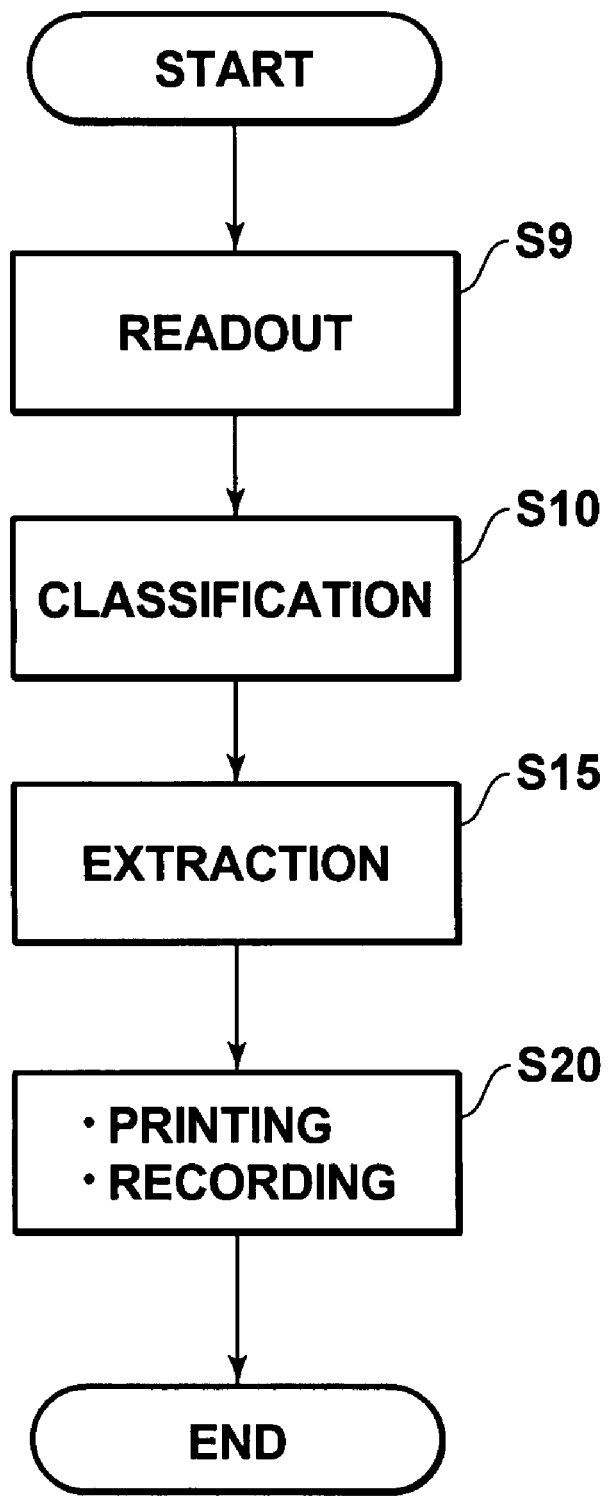

APPARATUS AND PROGRAM FOR SELECTING PHOTOGRAPHIC IMAGES

This Non-provisional application claims priority under 35 U.S.C. § 119(a) on Patent Application No(s). 2003-023901 filed in Japan on Jan. 31, 2003, the entire contents of which are hereby incorporated by reference.

BACKGROUND OF THE INVENTION

1. Field of the Invention

The present invention relates to an apparatus and program for selecting from among a plurality of photographic images, which have been obtained by photography.

2. Description of the Related Art

Digital cameras (in the following description, the term "digital camera" includes cellular telephones with built in cameras) are becoming widespread. The capacities of internal memories and external memory cards for recording and storing photographic images obtained by digital cameras are increasing, while the costs thereof are decreasing. Accompanying these trends, photography using digital cameras is being performed freely, and there is a tendency for the number of photographed images to increase exponentially. For example, the same subject is photographed a plurality of times when photographing a portrait, to obtain an image at a moment in which the subject has the most photogenic expression on his/her face. Also, during photography of athletic events, it is common to perform continuous photography of a plurality of images to obtain an image of a specific moment. When viewing and editing this great number of image data sets, it is necessary to be able to find a "best shot", that is, images that the user favors.

Various software programs for managing photographic images have been developed. For example, there are those that display photographic images, which have been obtained by a digital camera, as thumbnail images. When one of the thumbnail images is selected, a computer is operated to magnify and display the selected image. However, it is difficult to select a best shot from thumbnail images, as it is often the case that thumbnail images are too small to discern facial expressions of subjects therein. On the other hand, if the image is magnified and displayed, judgments regarding image quality are facilitated. However, as it is difficult to simultaneously view and compare a plurality of magnified images, selection of a best shot takes trouble and is inefficient.

Recently, print order reception devices are also becoming widespread. These print order reception devices enable selection of images to be printed, from among those recorded in a recording medium such as a memory card and a CD-ROM, only in two modes. In a first mode, the recording medium is inserted into the device, the photographic images are all displayed simultaneously, and the images desired as prints are specified. In a second mode, a "print all" button is pressed to order prints of all of the photographic images. In the first mode, there is a problem that judgments regarding image quality are difficult to make for the images which are simultaneously displayed, as described above. Meanwhile, the second mode is wasteful and uneconomical, because unnecessary images are printed as well as those for which printing is desired.

Japanese Unexamined Patent Publication No. 2001-256498 discloses a method of automatically selecting best shots from among a great number of photographic images. In this method, analytical processes are administered on a plurality of photographic images. Photographic images are classified into two categories and saved. The two categories are: those that satisfy predetermined judgment standards (qualified images) and those that do not (failed images). In this manner, best shots and other photographic images are automatically classified without user operations. Therefore, this method is efficient. A printer may perform different processes with respect to the qualified images and the failed images. Examples of these different processes are: printing only the qualified images; and printing the qualified images as full sized prints while printing the failed images as index prints.

However, when photographing images of athletic events, for example, there are cases in which only one image is obtained of a certain moment (for example, when a goal is scored). In such a case, a photographer desires to keep this image, regardless of the image quality thereof. However, there is a possibility that the method disclosed in Japanese Unexamined Patent Publication No. 2001-256498 would judge this image as a failed image. Therefore, problems arise afterwards when output processes, such as printing, are performed on the photographic images which have been classified. That is, an image of a scene which is important to the photographer may not be printed, or only printed as an index print.

SUMMARY OF THE INVENTION

The present invention has been developed in view of the above circumstances. It is an object of the present invention to provide an apparatus and a program for selecting photographic images which enables photographic images of scenes, which are possibly important to a user, to be positively kept, regardless of the image quality thereof.

The photographic image selecting apparatus of the present invention comprises:

a classifying means for classifying a plurality of photographic images into similar photographic image groups, comprising photographic images which are similar to each other, the similarities being determined by analyzing digital data representing the photographic images;

a qualified photographic image extracting means for extracting photographic images, that satisfy predetermined selection conditions as qualified photographic images, from each of the similar photographic image groups; and a differentiating and processing means for differentiating the qualified photographic images from the other photographic images and administering processes thereon.

That is, the photographic image selecting apparatus of the present invention first classifies the plurality of photographic images into similar photographic image groups. Then, qualified photographic images are extracted from each similar photographic image group. The extracted qualified photographic images and the other photographic images are differentiated and processed.

In the present invention, "photographic images" refer to digital data that represents photographic images. The "plurality of photographic images" may be photographic images which have been obtained by a digital camera and recorded on a medium such as a memory card. Alternatively, the "plurality of photographic images" may be digital data obtained by scanning a silver salt film, on which photographs have been recorded.

The "photographic images which are similar to each other" that constitute the similar photographic image groups are desirably photographic images of similar scenes. It is preferable that other photography conditions of the photographic images, such as: the time and date of photography; the location; the direction of the camera; the focal distance/focal position of the lens; the auto focus distance; and whether flash was employed, are similar.

As the classifying means for classifying the plurality of photographic images into similar photographic image groups, one may be employed that analyzes scene characteristics, such as the colors of the photographic images and the shapes of the subjects therein. The photographic images are then classified according to similarities in the analyzed scene characteristics. It is preferable that the classification is further performed based on data representing the aforementioned photography conditions, such as the time and date of photography, the location, and the direction of the camera. The photography condition data may be attached to the images.

The qualified photographic image extracting means of the present invention extracts photographic images that satisfy predetermined selection conditions from each similar photographic image group, as qualified photographic images. It is preferable that the selection conditions include image quality levels. Here, the image quality level refers to the quality of the entirety of the photographic image. Examples of criteria that determine the image quality are: whether underexposure or overexposure exists; whether the image is in focus; and whether the image is blurred. In the case that the subject is a person, the image quality level also includes criteria such as: whether the face of the subject is in focus; and whether the subject's eyes are open. Regarding judgment of whether the face of the subject is in focus, the judgment can be made by extracting the face portion of the image by employing a facial extraction technique. Regarding the judgment of whether the subject's eyes are open, a red-eye extracting technique may be employed, for example. There is no limitation on the techniques to be employed regarding these judgments, and any known technique may be employed.

Further, whether a photographic image is that which has been retaken due to mistaken flash photography may be a criterion that determines image quality. For example, consider a case in which two photographic images have adjacent times of photography and similar backgrounds, yet data indicating whether flash was used, included in the tag information thereof, differ (flash was used in one and not in the other). In this case, a qualified photographic image is extracted by either assuming that the photographic image in which flash was used is the qualified image, or that the photographic image obtained later is the qualified image.

It is preferable that the qualified photographic image extracting means of the photographic image selecting apparatus according to the present invention is equipped with a selection condition setting means. It is preferable that the selection condition setting means is enabled to set selection conditions for each of the similar photographic image groups.

It is desirable that the selection condition setting means sets the selection conditions so that at least one qualified photographic image is extractable from each of the similar photographic image groups.

The selection condition setting means may set the selection conditions based on the number of photographic images included in the similar photographic image groups. The selection conditions may be set stricter for similar photographic image groups having greater numbers of photographic images therein.

Alternatively, the selection condition setting means may set the selection conditions according to a number of qualified photographic images which is specified for each of the similar photographic image groups.

The differentiating and processing means of the photographic image selecting apparatus according to the present invention differentiates and processes the qualified photographic images and the other photographic images. Here, "differentiates and processes" may refer to processing the qualified photographic images and the other photographic images by different processes. Alternatively, "differentiates and processes" may refer to processing the qualified photographic images and the other photographic images with the same process, but at different levels. "Different processes" refer to, for example, printing the qualified photographic images, while recording the other photographic images in a recording medium such as a CD-R, without printing them. "The same process, but at different levels" refers to, for example, in the case that the process is printing, printing only the qualified photographic images. Alternatively, the qualified photographic images and the other photographic images may be printed at different sizes (full size prints for the qualified photographic images, and index size prints for the other photographic images).

In the case that the process is recording photographic images in a recording medium, the qualified photographic images and the other photographic images may be differentiated and recorded. Alternatively, only the qualified photographic images may be recorded in the recording medium. Here, "differentiated and recorded" refers to recording the qualified photographic images and the other photographic images in the recording medium so that they can be discriminated from each other. The discrimination may be accomplished, for example, by recording the qualified photographic images and the other photographic images in different folders. Alternatively, the qualified photographic images may be recorded as high resolution images while the other photographic images are recorded as low resolution images. In addition, each of the qualified photographic images and the other photographic images may be recorded with auxiliary data, indicating which type of photographic image it is, attached thereto.

In the case that the process is display, it is preferable that the differentiating and processing means of the photographic image selecting apparatus according to the present invention displays only the qualified photographic images.

In the case that the process is displaying the plurality of photographic images as a slideshow, it is preferable that the differentiating and processing means display the qualified photographic images and the other photographic images for different display durations. Desirably, the display durations are set so that the qualified photographic images are displayed for a longer time than the other photographic images.

The program of the present invention, which causes a computer to execute selection of photographic images, comprises:

a classifying procedure for classifying a plurality of photographic images into similar photographic image groups, comprising photographic images which are similar to each other, the similarities being determined by analyzing digital data representing the photographic images;

a qualified photographic image extracting procedure for extracting photographic images, that satisfy predetermined selection conditions as qualified photographic images, from each of the similar photographic image groups; and a differentiating and processing procedure for differentiating the qualified photographic images from the other photographic images and administering processes thereon.

Note that the program of the present invention may be provided as a computer readable medium having the program recorded therein.

A skilled artisan would know that the computer readable medium is not limited to any specific type of storage device, and includes any kind of device, including but not limited to:

CD's, floppy disks, RAM's, ROM's, hard disks, magnetic tapes and internet downloads, in which computer instruction can be stored and/or transmitted. Transmission of computer code through a network or through wireless transmission means is also within the scope of this invention. Additionally, computer code/instructions include but are not limited to: source, object, and executable code, and may be in any language including: higher level languages, assembly language, and machine language.

According to the photographic image selecting apparatus of the present invention, first, a plurality of photographic images obtained by photography are classified into similar photographic image groups. Then, qualified photographic images are extracted from each of the similar photographic image groups. Thereby, best shots are selected, while best shots of similar scenes are automatically selected.

A construction may be adopted wherein the qualified photographic image extracting means of the photographic image selecting apparatus according to the present invention is equipped with a selection condition setting means. Selection conditions may be set so that at least one qualified photographic image is extracted from each of the similar photographic image groups. In this case, at least one photographic image is extracted as a qualified photographic image from each similar photographic image group, which is a scene that the photographer intended to photograph. In the case that only one photograph was obtained for a scene, such as the aforementioned example (the moment that a goal was scored), this photograph is an important image, even if the image quality is somewhat poor. By setting the selection conditions so that at least one qualified photographic image is extracted from each of the similar photographic image groups, the one photograph will be selected, enabling selection according to the photographer's intentions.

In addition, there is a high probability that photographic images, which are classified in a similar photographic image group, are photographic images obtained a plurality of times of the same scene or the same subject. The selection condition setting means may set the selection conditions based on the number of photographic images included within a similar photographic image group. By setting stricter selection conditions for similar photographic image groups having a greater number of photographic images included therein, the number of selected best shots can be narrowed down. Therefore, waste, arising from selection of a great number of qualified photographic images of the same scene or the same subject, can be avoided.

Alternatively, the selection condition setting means may set the selection conditions according to a specified number of qualified photographic images to be extracted. In this case, the selection conditions are set stricter as the number of qualified photographic images to be extracted is smaller. Thereby, a number of qualified photographic images desired by the user can be selected.

The photographic image selecting apparatus of the present invention may be applied to various fields. For example, if printing is to be performed, the differentiating and processing means of the photographic image selecting apparatus according to the present invention may be operated to print only the qualified photographic images. Thereby, printing of the other photographic images can be avoided, which is economical. Alternatively, the qualified photographic images may be printed at full size, while the other photographic images are printed at a different size, preferably a small size such as that of index prints. In this case, the qualified photographic images can be printed as full size prints, while the other photographic images are printed at a small size, which is economical. At the same time, the contents of the other photographic images are enabled to be confirmed by the user.

As another example, the differentiating and processing means of the photographic image selecting apparatus according to the present invention may perform a storage process, wherein photographic images are recorded in a recording medium. The differentiating and processing means may be operated to record only the qualified photographic images in the recording medium. In this case, when the photographic images which are recorded in the recording medium are to be utilized, only the qualified photographic images are recorded therein, which is convenient. Alternatively, the qualified photographic images and the other photographic images may be differentiated and recorded. In this case, when the photographic images are utilized, discrimination between the qualified photographic images and the other photographic images is facilitated. At the same time, because the other photographic images are recorded as well, photographic images to be utilized may also be searched from among the other photographic images, which is reassuring.

As yet another example, the differentiating and processing means of the photographic image selecting apparatus according to the present invention may be a display means. The display means may display only the qualified photographic images. In this case, the user finds convenience in that only the qualified photographic images are displayed. On the other hand, if the photographic images are displayed as a slideshow, the qualified photographic images and the other photographic images may be displayed for different display durations. Specifically, the qualified photographic images may be displayed for long display durations, and the other photographic images may be displayed for display durations shorter than those of the qualified photographic images. By altering the display durations in this manner, the user is enabled to discriminate between the qualified photographic images and the other photographic images, while confirming the contents of all of the photographic images.

BRIEF DESCRIPTION OF THE DRAWINGS

FIG. 1A is a block diagram illustrating the construction of a photographic image output service system, which is an embodiment of the present invention.

FIG. 1B is a block diagram illustrating the construction of an extracting portion.

FIG. 3 is a flow chart that illustrates the operation of the photographic image output service system shown in FIG. 1.

DESCRIPTION OF THE PREFERRED EMBODIMENTS

Figure 2:
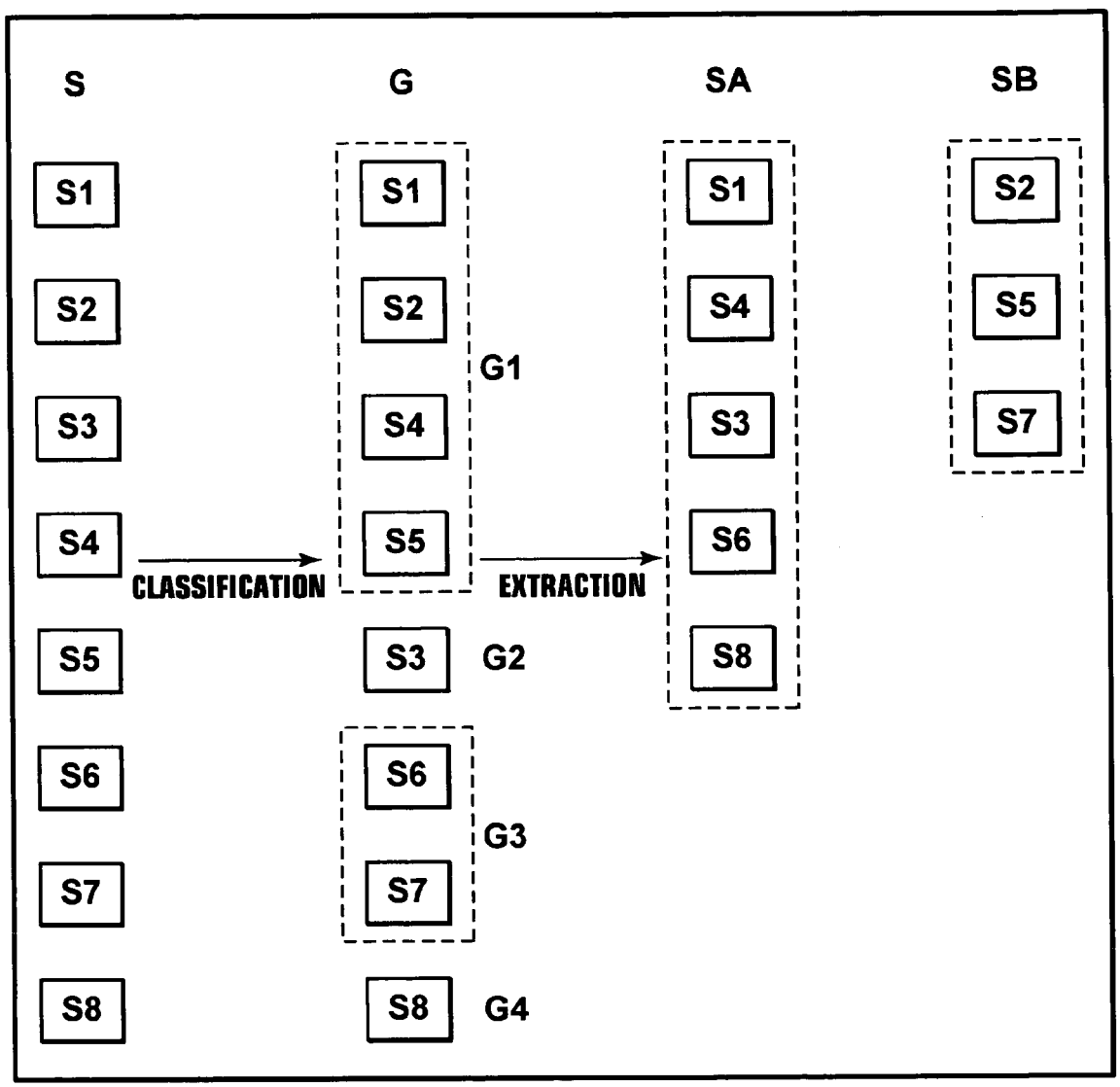
FIG. 2 illustrates an example of the classification of photographic images S into groups G by a classifying portion, as well as the extraction of qualified photographic images SA from each of the groups G by the extracting portion.

Hereinafter, an embodiment of the present invention will be described with reference to the attached drawings.

FIG. 1A is a block diagram illustrating the construction of a photographic image output service system, which is an embodiment of the present invention. As shown in FIG. 1A, the photographic image output service system of the present embodiment comprises: a readout portion 10, for reading a plurality of photographic images S (S1, S2, ... Sn, wherein n is an integer greater than or equal to 2) from a memory card 1, in which a plurality of photographic images obtained by photography with a digital camera is recorded; a classifying portion 15, for classifying similar photographic images from among the photographic images S into a plurality of groups G (G1, G2, ... Gm, wherein m is an integer greater than or equal to 1 and less than or equal to n); an extracting portion 20, for extracting qualified photographic images SA (SA1, SA2, ... SAk, wherein k is an integer greater than or equal to m and less than or equal to n) from each of the groups G, in which the photographic images S have been classified by the classifying portion 15; a printing portion 30 for printing each of the qualified photographic images, which have been extracted by the extracting portion 20; and a recording portion 40 for recording the qualified photographic images SA, which have been extracted by the extracting portion 20, and the other photographic images SB (SB1, SB2, ... SBj, wherein j=n−k) in a CD-R recording medium.

Specifically, the classifying portion 15 groups the photographic images S as described below. First, the classifying portion 15 refers to time data, representing the photography time, which is attached to the photographic images S. Photographic images having adjacent photography times and between which the intervals are shorter than a predetermined threshold value are classified into the same group Ga (Ga1, Gb2, ... Gam1, wherein m1 is an integer greater than or equal to 1). Next, the classifying portion 15 refers to location data, representing the photography location, which is attached to the photographic images S. Photographic images having the same photography location within each of the groups Ga are further grouped into groups Gb (Gb1, Gb2, ... Gbm2, wherein m2 is an integer greater than or equal to m1). Then, photographic images having the same camera direction within each of the groups Gb are grouped into groups Gc (Gc1, Gc2, ... Gcm3, wherein m3 is an integer greater than or equal to m2). Finally, the scenes pictured in the photographic images are analyzed for photographic images having the same photography location, from among all of the groups Gc. Different groups Gc, which have approximately the same scenes pictured in the photographic images therein, are combined to obtain groups G (G1, G2, ... Gm). That is, the groups G contain photographic images in which the same scene is pictured, even though the times of photography differ.

The extracting portion 20 extracts qualified photographic images from each group G. FIG. 1B is a block diagram illustrating the construction of the extracting portion 20. As shown in FIG. 1B, the extracting portion 20 comprises: a selection condition setting portion 20a, for setting standards for selecting qualified photographic images for each group; and an extraction executing portion 20b for extracting photographic images that satisfy the selection conditions set by the selection condition setting portion 20a, from each of the groups G.

The selection condition setting portion 20a obtains the number of photographic images within each of the groups G, and sets selection conditions based on the numbers according to the following rules.
1. Selection conditions are to be made stricter for groups having greater numbers of photographic images therein.
2. For groups containing only one image, the one image is selected as a qualified photographic image.

Various selection conditions may be set according to the construction of the system. In the present embodiment, the specific selection conditions are: degree of under/overexposure (including none); degree of defocus (including none); and degree of blur (including none), in the case of landscape photographs. In the case of a portrait photograph, the selection conditions may further include: degree of defocus of a facial portion; and whether the eyes of a subject are open.

The extraction executing portion 20b extracts qualified photographic images from each group G, based on the selection conditions set at the selection condition setting portion 20a. Specifically, for example, a photographic image is extracted as a qualified photographic image from a group G which has only one photographic image therein, according to the selection condition set for a group G which has only one photographic image therein (the one photographic image is the qualified photographic image) With respect to a group G which has a plurality of photographic images therein, first, whether the photographic images within the group G are landscape or portrait photographs is judged. In the case that the photographic images are landscape photographs, each of the photographic images are analyzed to obtain the degrees of under/overexposure, defocus, and blur. Then, qualified photographic images are extracted, based on the selection conditions, which have been set for the group G according to the number of photographic images therein. In the case that the photographic images are portrait photographs, qualified photographic images are extracted based on degree of defocus and whether the eyes of a subject are open, in addition to the selection conditions for landscape photographs.

There is no particular limitation regarding the techniques employed for the detection of the degree of under/overexposure, the degree of defocus, the degree of blur, whether the eyes of a subject are open, and for the facial extraction. Any known technique may be applied. For example, the technique disclosed in Japanese Patent Publication No. 3 (1991)-76449 is applied to detect the degree of defocus in the present embodiment. That is, first, local and global contrasts are obtained for an image. Then, a value which is determined by frequency distribution of the local contrast is set as a first characteristic amount, and the global contrast is set as a second characteristic amount. Next, regions of defocused images and focused images are experimentally derived, from within a characteristic space defined by the first and second characteristic amounts. Thereby, a borderline between the two regions is determined ad recorded in advance. During actual detection of the degree of defocus with respect to an image, the first and second characteristic amounts of the image are applied to the characteristic space. Then, a judgment is made whether the image is a defocused image, by the coordinates of the characteristic amounts with respect to the borderline within the characteristic space. In the case that the image is a defocused image, the degree of defocus is judged by the distance of the coordinates from the borderline. The judgment of whether the image is defocused may be performed only on the portion of the image that contains the main subject (for example, the central portion of the image), instead of the entirety of the image.

The selection condition setting portion 20a sets stricter selection conditions regarding the degree of defocus for groups G having greater numbers of photographic images therein. That is, the degree of defocus for photographic images, which are selected as qualified photographic images, is set lower.

In the case that the photographic images are portrait photographs, the facial portion of the image is extracted. Then, the aforementioned defocus detecting technique is applied to the facial portion to detect whether the facial portion is defocused, and if it is, to what degree. In the present embodiment, for example, the technique disclosed in Japanese Unexamined Patent Publication No. 2000-48184 is employed to extract the facial portion of a photographic image. Specifically, first, pre-processes for facial region extraction, such as pixel deletion and brightness adjustment, are performed. Then, skin-colored pixels are detected from the pre-processed photographic image. Next, the projection distribution of the skin-colored pixels is derived from the detection results thereof. Thereafter, skin-colored regions of shapes which are characteristic of a facial region is searched for, based on the projection distribution of the skin-colored pixels, to obtain candidates for facial regions. Finally, judgments are made regarding whether the facial region candidates are facial regions or not, based on a predetermined method by a neural network or the like, to extract the facial portion of the image.

In addition, a technique for extracting eye portions, which are often employed to detect red eye, may be applied to detect whether the eyes of a subject are open, in the case of portrait photographic images. For example, first, a region that contains the eyes (this region may be specified manually, or be that which is automatically judged, such as a facial region) is cut out from the photographic image. Then, a brightness histogram is generated of this region of the image. Thereafter, the low brightness histogram region is extracted from the brightness histogram, and the entire eye regions are extracted by reducing and correcting the extracted low brightness regions. Whether the eyes are open is judged based on the size of the extracted eye regions (including none).

FIG. 2 illustrates an example of the classification of the photographic images S into the groups G by the classifying portion 15, as well as the extraction of qualified photographic images SA from each of the groups G by the extracting portion 20. As shown in FIG. 2, the photographic images S (S1, S2, S3, . . . S8) have been analyzed by the classifying portion 15 as follows. Images S1, S2, and S3 have been obtained at the same photography location within short time intervals; however, image S3 has been obtained with a different camera direction. Images S4 and S5 have different photography times from those of images S1 and S2; however, they are images of the same scene, which have been obtained at the same photography location, as that of images S1 and S2. Images S6 and S7 have been obtained at the same photography location with each other, at different photography times from those of images S1 through S5. Image S8 has different a photography time and photography location from images S1 through S7. The classifying portion 15 classifies these photographic images S into: group G1, which contains images S, S2, S4, and S5; group G2, which contains image S3; group G3, which contains images S6 and S7; and group G4, which contains image S8.

The extracting portion 20 extracts qualified photographic images SA from each of the groups G. Groups G2 and G4 both contain only a single photographic image. Therefore, the single photographic images (S3 and S8) of the groups G2 and G4 are extracted as the qualified photographic images. The photographic images S1, S2, S4, and S5 of group G1 are photographic images taken of the same person. Image S2 is defocused, and the subject's eyes are closed in image 5. Therefore, images S1 and S4 are extracted from group G1 as the qualified photographic images. The photographic images S6 and S7 of group G3 are landscape photographs, of which image S7 is blurred. Therefore, image S6 is extracted from group G3 as the qualified photographic image. Note that in this example, the number of photographic images included in each group G is not great. Therefore, a detailed description of the setting of selection conditions by the selection condition setting portion 20a according to the number of photographic images included in the groups is omitted. However, the selection condition setting portion 20a may operate such that groups containing one to five images have the same selection conditions set therefor, and groups containing six to ten images have stricter selection conditions set therefor.

FIG. 3 is a flow chart that illustrates the operation of the photographic image output service system according to the present embodiment. As shown in FIG. 3, the photographic image output service system according to the present embodiment prints and records onto a CD-R a plurality of photographic images obtained by photography using a digital camera. First, the plurality of images S (S1, S2, . . . Sn, wherein n is an integer greater than or equal to 2), which have been obtained by a digital camera, are read out from a memory card 1 (step S5). Then, the classifying portion 15 classifies photographic images which are similar to each other, from among the photographic images S, into a plurality of groups G (G1, G2, . . . Gm, wherein m is an integer greater than or equal to 1 and less than or equal to n) (step S10). The extracting portion 20 extracts qualified photographic images SA (SA1, SA2, . . . SAk, wherein k is an integer greater than or equal to m and less than or equal to n) from each of the groups G, to which the classifying portion 15 has grouped the photographic images (step S15). The printing portion 30 outputs the qualified photographic images SA as prints, and the recording portion 40 records the qualified photographic images SA as well as photographic images SB (SB1, SB2, . . . SBj, wherein j=(n−k)) other than the qualified photographic images SA into different folders of a CD-R, which is a recording medium (step S20).

In this manner, the photographic image output service system according to the present embodiment groups a plurality of photographic images, which have been obtained by a digital camera, into groups of similar photographic images. Then, at least one qualified photographic image is extracted from each of the similar photographic image groups. Therefore, best shots are enabled to be automatically selected, while at least one qualified photographic image is selected for each scene intended to be photographed by the photographer. The printing portion 30 prints only the qualified photographic images, thereby avoiding wasteful printing of photographic images having low image quality. The recording portion 40 records the qualified photographic images and the other photographic images into different folders of the CD-R, thereby enabling facilitated discrimination among the qualified photographic images and the other photographic images when the CD-R is utilized later, which is convenient.

An embodiment of the photographic image selecting apparatus and program of the present invention has been described above. However, the present invention is not limited to the above embodiment. Various modifications are possible as long as the substance of the present invention is unchanged.

For example, the photographic image output service system described in the above embodiment is equipped with the printing portion 30 for performing printing processes and the recording portion 40 for performing recording processes. The printing portion 30 and the recording portion 40 serve as the differentiating and processing means for differentiating and processing the extracted qualified photographic images and the other photographic images. However, a construction may be adopted wherein only one of the printing portion 30 and the recording portion 40 are provided. Further, the differentiating and processing means may perform processes other than printing and recording, such as display processes. In this case, the differentiated process may be a process that displays only the qualified photographic images, or a process that displays the qualified photographic images and the other photographic images as slides for different display durations.

In addition, in the photographic image output service system of the above embodiment the printing portion 30 prints only the qualified photographic images. However, a construction may be adopted wherein the qualified photographic images are printed as full sized prints while the other images are printed as index prints. Note that the qualified photographic images may be printed as index prints as well.

Further, in the photographic image output service system of the above embodiment, the recording portion 40 records the qualified photographic images and the other photographic images in different folders. However, a construction may be adopted wherein only the qualified photographic images are recorded. Alternatively, the qualified photographic images and the other photographic images may be recorded at different resolutions, different compression rates, or with different data attached thereto, to enable discrimination among the two types of images.

Still further, in the photographic image output service system of the above embodiment, the selection condition setting portion 20*a* of the extracting portion 20 sets selection conditions according to the number of photographic images within the similar photographic image groups. That is, the selection condition setting portion 20*a* sets stricter selection conditions for similar photographic image groups having a greater number of photographic images therein. However, the selection conditions may be set according to a number of qualified photographic images to be extracted, which is set by user preference or is predetermined within the system. For example, the selection conditions may be set stricter as the specified number of qualified photographic images is lower. Alternatively, a construction may be adopted wherein the selection conditions are manually set by a user.

The photographic image output service system of the above embodiment reads the photographic images out from the memory card and administers processes thereon. However, a construction may be adopted wherein processes are administered on photographic images which have been transmitted via a network. Further, a construction may be adopted wherein a device for reading out (or receiving, or storing) photographic images, a device for classifying the photographic images into similar photographic image groups, a device for extracting qualified photographic images, and a device for differentiating and processing the photographic images are provided separately, connectable via a network.

The photographic images, which are the subjects of the processes of the present invention, are not limited to those obtained by a digital camera. The photographic images include digital data obtained by scanning silver salt films or prints as well.

The invention claimed is:

1. A photographic image selecting apparatus comprising:
    a classifying means for classifying a plurality of photographic images into similar photographic image groups, comprising photographic images which are similar to each other, the similarities being determined by analyzing digital data representing the photographic images;
    a qualified photographic image extracting means for extracting photographic images, that satisfy previously stored predetermined selection conditions as qualified photographic images, from each of the similar photographic image groups, wherein the previously stored predetermined selection conditions relate to image quality;
    a differentiating and processing means for differentiating the qualified photographic images from the other photographic images and administering processes thereon, and
    a recording means for recording the differentiated photographic images;
    wherein:
    the qualified photographic image extracting means is equipped with a selection condition setting means, and
    the selection condition setting means sets and stores the selection conditions, after the classifying means classifies the photographic images, for each similar photographic image group, so as to be stricter for similar photographic image groups having a greater number of photographic images included therein; and
    the selection condition setting means sets and stores, as the selection conditions:
    (i) degree of underexposure or overexposure, degree of defocus, and degree of blur, in the case of a group classified as landscape photographs; and
    (ii) degree of underexposure or overexposure, degree of defocus, degree of blur, degree of defocus of a facial portion, and whether eyes of a subject are open, in a case of a group classified as portrait photographs.

2. A photographic image selecting apparatus as defined in claim 1, wherein:
    the predetermined selection conditions include image quality levels.

3. A photographic image selecting apparatus as defined in claim 1, wherein:
    the selection condition setting means sets the selection conditions so that at least one qualified photographic image is extracted from each of the similar photographic image groups.

4. A photographic image selecting apparatus as defined in claim 1, wherein:
    the selection condition setting means sets the selection conditions according to a specified number of qualified photographic images to be extracted from each of the similar photographic image groups.

5. A photographic image selecting apparatus as defined in claim 1, wherein:
    the differentiating and processing means performs processes wherein only the qualified photographic images are printed.

6. A photographic image selecting apparatus as defined in claim 1, wherein:
    the differentiating and processing means performs processes wherein the qualified photographic images and the other photographic images are printed at different sizes.

7. A photographic image selecting apparatus as defined in claim 1, wherein:
    the differentiating and processing means performs processes wherein the qualified photographic images and the other photographic images are differentiated, then recorded in the recording means, the qualified photographic images being stored separately from the other photographic images.

8. A photographic image selecting apparatus as defined in claim 1, wherein:
    the differentiating and processing means performs processes wherein only the qualified photographic images are recorded in a recording medium.

9. A photographic image selecting apparatus as defined in claim 1, wherein:
    the differentiating and processing means is a display means; and
    only the qualified photographic images are displayed thereby.

10. A photographic image selecting apparatus as defined in claim 1, wherein:
    the differentiating and processing means is a slideshow display means; and
    the qualified photographic images and the other photographic images are displayed as slides for different display durations.

11. The photographic image selecting apparatus of claim 1, wherein the qualified photographic image extracting means extracts photographic images that satisfy predetermined selection conditions, said predetermined selection conditions being based on image quality.

12. The photographic image selecting apparatus of claim 1, wherein the predetermined selection conditions are related to at least one of degree of exposure, degree of defocus, degree of blur, degree to defocus of a facial portion, and whether an eye of a subject being photographed is open.

13. A computer readable medium having recorded therein a program that causes a computer to execute selection of photographic images, comprising:
   a classifying procedure for classifying a plurality of photographic images into similar photographic image groups, comprising photographic images which are similar to each other, the similarities being determined by analyzing digital data representing the photographic images;
   a qualified photographic image extracting procedure for extracting photographic images, that satisfy previously stored predetermined selection conditions as qualified photographic images, from each of the similar photographic image groups, wherein the previously stored predetermined selection conditions relate to image quality;
   a differentiating and processing procedure for differentiating the qualified photographic images from the other photographic images and administering processes thereon, and
   a recording procedure for recording the differentiated photographic images;
   wherein:
   the qualified photographic image extracting procedure includes a selection condition setting procedure, and
   the selection condition setting procedure includes a step for setting and storing the selection conditions after the classifying means classifies the photographic images, for each similar photographic image group, so as to be stricter for similar photographic image groups having a greater number of photographic images included therein; and
   the selection condition setting procedure sets and stores, as the selection conditions:
   (i) degree of underexposure or overexposure, degree of defocus, and degree of blur, in the case of a group classified as landscape photographs; and
   (ii) degree of underexposure or overexposure, degree of defocus, degree of blur, degree of defocus of a facial portion, and whether eyes of a subject are open, in a case of a group classified as portrait photographs.

14. A method, performed by a photographic image selecting apparatus, for selecting photographic images, comprising:
   classifying, at a classifying portion, a plurality of photographic images into similar photographic image groups, each of the photographic image groups comprising photographic images which are similar to each other, the similarities being determined by analyzing digital data representing the photographic images;
   determining the total number of photographic images in each of the photographic image groups classified by the classifying portion;
   setting and storing, at a selection condition setting portion, selection conditions, after the classifying portion classifies the plurality of photographic images, based on image quality for each similar photographic image group having the classified plurality of photographic images based on the determined total number of photographic images, wherein when a total number of photographic images in one photographic group is larger than a predetermined threshold, the selection conditions are different than the selection conditions that are set for photographic groups having less than the predetermined threshold, wherein selection conditions include:
   (i) degree of underexposure or overexposure, degree of defocus, and degree of blur, in the case of a group classified as landscape photographs; and
   (ii) degree of underexposure or overexposure, degree of defocus, degree of blur, degree of defocus of a facial portion, and whether eyes of a subject are open, in a case of a group classified as portrait photographs;
   extracting, at an extracting portion, photographic images from each of the photographic image groups classified by the classifying portion, that satisfy the set selection conditions as qualified photographic images;
   differentiating, at the extracting portion, the qualified photographic images from the other photographic images and administering processes thereon; and
   recording the differentiated photographic images.

* * * * *